Oct. 8, 1929.   J. J. HINDE   1,730,849
METHOD AND APPARATUS FOR MAKING FIBROUS BOARD
Filed Oct. 31, 1927
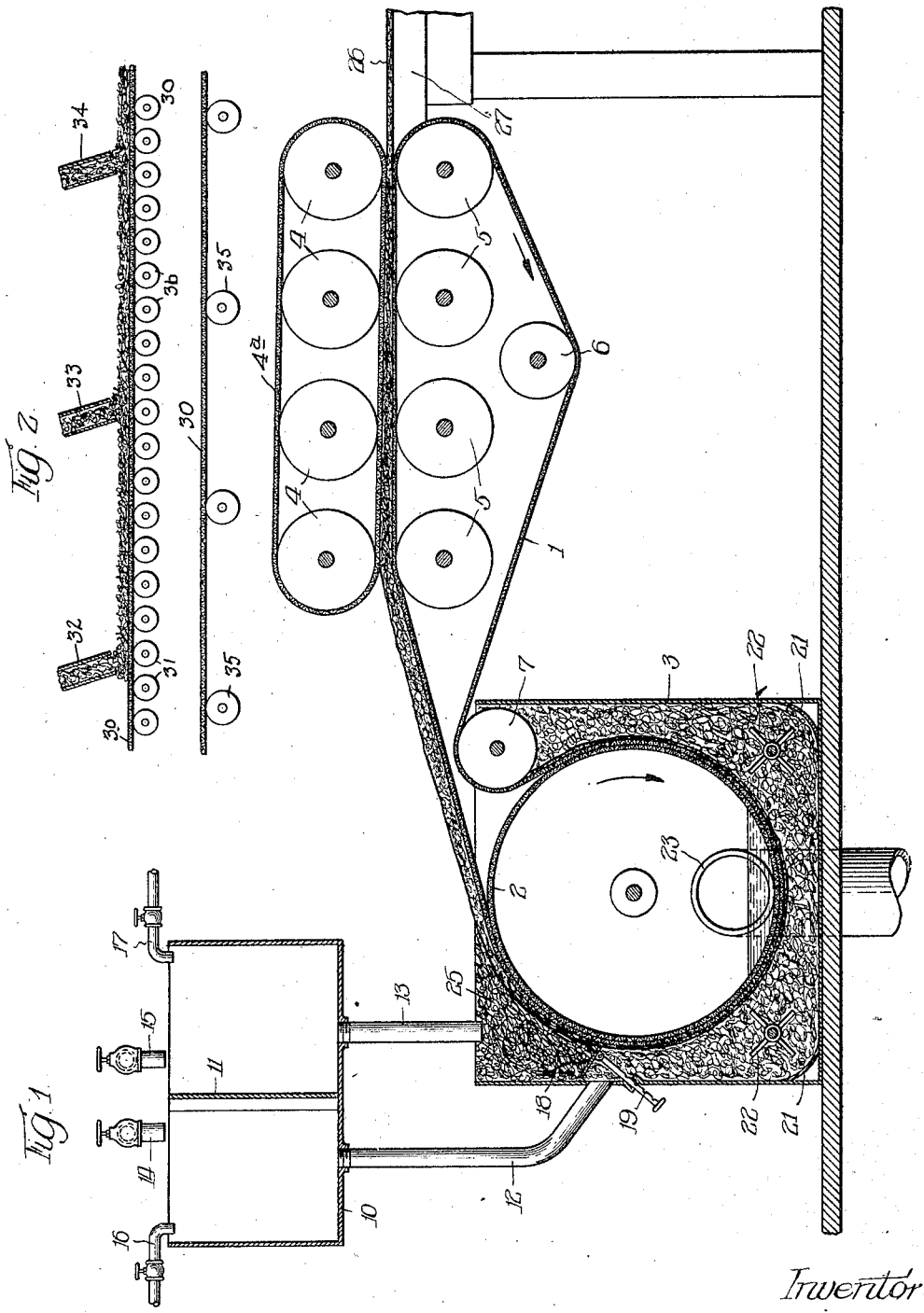

Patented Oct. 8, 1929

1,730,849

UNITED STATES PATENT OFFICE

JAMES J. HINDE, OF CHICAGO, ILLINOIS, ASSIGNOR TO THE HINDE PRODUCTS COMPANY, OF CHICAGO, ILLINOIS, A CORPORATION OF ILLINOIS

METHOD AND APPARATUS FOR MAKING FIBROUS BOARD

Application filed October 31, 1927. Serial No. 229,935.

This invention relates in general to a sheet board or other object composed of fibrous layers of different strength, porosity or density, and has more particular reference to the formation of such a board or sheet from fibres of wood, plants of various kinds, such as corn stalks and other fibrous materials.

An important object of the invention is to form a mass or body of composite layers of hard or soft material of varying quality, the layers being composed of short or long fibres of the same kind or of different kinds.

A further object of the invention is to provide means for conducting pulp to a movable screen or to a forming base from separate compartments containing fibres of various kinds, either long or short or of a relatively weaker or stronger character.

A further object of the invention is in forming a fibrous mass in different layers of which one or more may be a porous or thermal nonconducting nature, and still may be of considerable tensile strength.

A still further object of the invention is in the provision of an apparatus in which fibres of the same kind but of different density of solution may be applied to a moving screen in such a manner as to form layers of different strength, porosity, density and thickness to vary the character of the finished material.

Other objects will appear hereinafter, the accompanying drawings illustrating more or less diagrammatically an apparatus in which the method of forming a porous board may be practised.

In the accompanying drawing, Fig. 1 is a more or less diagrammatic and sectional view of an apparatus constructed in accordance with the principles of this invention; and Figure 2 shows a modification.

In forming a porous board or sheet of fibrous material, it may be desirable to provide layers of different characteristics. For example, in a wall board for building purposes, one layer of the board may be of a porous character as a base for plaster, cement, or asphaltic material, whereas another layer may be made fire and water resisting. A board of this character should have both strength and thermal non-conducting qualities. A board of this kind may be prepared to provide for a varied usefulness.

It is contemplated that a board of varying fibrous layers may be made upon a stationary screen by consecutive applications of fibrous layers of different characteristics; if a traveling screen is used, the fibrous layers are applied at different parts of the travel. Such a screen may be of any foraminous material and if it is movable, an endless screen may be employed which passes through a forming vat upon a forming cylinder or may travel through a vat upon a horizontal or inclined plane to receive the fibrous material.

Referring more particularly to the drawing, an endless belt or screen 1 is shown as passing around the periphery of a forming cylinder 2 having an outer shell of foraminous material and rotatable in a forming vat 3. The screen 1 may pass over and between a number of forming rollers 4 and 5 and is guided by them and rollers 6 and 7 into and out of the forming vat 3. An endless screen may extend around the rollers 4, if desired.

Arranged above the forming vat 3 is a regulating box 10 having one or more partitions 11 for dividing it into separate compartments connected by discharge pipes 12 and 13 with various parts of the forming vat 3. A pair of valve controlled supply pipes 14 and 15 are arranged to discharge pulp into the compartments of the regulating box, and valve liquid supply pipes 16 and 17 are also arranged to discharge a mixing liquid into the separate compartments to vary the character of the pulp therein.

One of the discharge pipes 12 is connected with the forming vat 3 on one side of a movable plate or partition 18 which may be hinged along one edge to the side of the forming vat 3 and adjusted with respect to the position of the other edge and its relation to the forming cylinder 2 by means of a regulating screw or device 19 operable from the outside of the forming vat. The other pipe 13 discharges pulp from another compartment of the regulating box on the opposite side of the partition 18.

The forming vat is preferably provided with rounded corners 21 at the bottom to prevent the accumulation of pulp therein and to facilitate cleaning the vat and agitators 22 are mounted adjacent the corners to stir up the pulp at these places. A liquid discharge pipe 23 communicates with the interior of the forming vat at one end of the cylinder 2 for removing surplus liquid therefrom and for causing a difference in pressure between the interior and exterior of the cylinder. This causes the fibrous material to adhere to the endless belt 1 as it passes around the cylinder in the direction of the arrow.

Instead of having a two-stage apparatus for applying fibrous material to the screen, it is apparent that a greater number of partitions similar to the adjustable partition 18 may be provided around the periphery of the forming cylinder, and fibrous material or pulp of different character admitted on the opposite sides of each of the partitions. The embodiment shown is, therefore, illustrative of a method of applying fibrous material in two stages, but the material may be of the same kind having fibres of different lengths; the fibres may be of entirely different materials; the fibres may be of entirely different strengths; and the fibres may be of entirely different characteristics, such, for example, one may be fire proof and the other not fire proof. The materials may be of different density or porosity. The different layers may be of various thicknesses and in the embodiment shown, it is intended that a thin layer of relatively fine material is applied first to the screen 1 as it passes the greater portion of the way about the cylinder 2, the thickness of this layer being regulated by the position of the blade 18, and then a thicker layer of relatively coarse pulp or fibre 25 is applied to the layer already on the screen 1, forming a thick layer of fibrous material which is then passed between the rollers 4 and 5 to compress the fibrous material into any usable form or into a continuous layer 26 which is passed upon a table 27 when the screen 1 is separated from the bottom thereof, and after the greater part of the liquid content of the formed material is squeezed therefrom by the rollers 4 and 5.

It is not intended to limit this apparatus to use with any single fibrous material as it may be used with a variety of such materials for producing different resulting products. Even the same fibrous material may be combined in different ways to produce entirely different resultant structures, as for example, the forming of a board, sheet or other object having a porous or hard surface for receiving plaster, cement, or the like, or the same material may be made more compact and of a stronger nature of greater tensile strength so that it will have a different use and application.

Instead of employing a forming vat as shown in Figure 1, an endless belt 30 may be supported upon a number of rollers 31 to pass directly below a plurality of pipes or chutes 32, 33 and 34 for discharging different pulps in masses or layers as the belt 30 moves along. These discharge chutes may receive the same character of pulp of different density of solution, or pulp of different materials; it may be deposited in layers or masses of the same or different sizes; and the flow of pulp may be controlled or varied as desired, in any well known manner. Rollers 35 carry the endless belt 30 upon its return movement.

After depositing the layers of pulp upon the belt 30, it may be squeezed and dried as previously explained.

It is obvious that other combinations of the same or similar fibres may be produced without varying the scope of the invention.

I claim:

1. The method of making a laminated fibrous board in a homogeneous mass on one screen which consists in applying pulps of different character to the same screen as it is moved through a forming vat and in moving the screen from the vat in a substantially horizontal direction with the pulps thereon.

2. The method of making a composite board of a number of layers of fibrous material on a single screen which consists in moving the screen about a screen cylinder in a forming vat and applying pulps of different character to the screen at different portions of the cylinder and in withdrawing the layers from the vat in a horizontal direction on the screen.

3. The method of making a composite board or sheet of a number of layers of fibrous material which consists in partitioning the space outside of a screen cylinder in a forming vat in such a manner that pulp of different character is introduced into the partitioned spaces, in passing a screen through the vat about the cylinder to accumulate successive interwoven layers upon the screen and in taking off the screen from the top of the cylinder in a horizontal direction so the fibrous material will not fall back into the vat.

4. The method of making a fibrous sheet composed of layers of varying density which comprises the admission of thin pulp to a movable screen at one stage of its movement in a vat and thicker pulp at another stage, and the removal of the pulp on the screen from the vat in a substantially horizontal direction.

5. The method of making a composite fibrous sheet of layers of varying porosity which comprises the movement of a screen about a foraminous cylinder in a forming vat, in partitioning the space in the vat outside of the screen, in supplying pulp of varying density to the chambers formed by the partitions, in withdrawing the layers of pulp from the vat upon the screen in a horizontal direc- 6. The method of making fibrous sheets with composite layers of varying strength which consists in moving a screen about a foraminous cylinder in a forming vat, in partitioning the space outside of the cylinder in the vat, in supplying pulp of different thickness to the chambers of the vat, in controlling the thickness of the layer of fibrous material on the screen as it passes from a chamber by the partition between it and the next chamber and in removing the fibrous material from the vat in a horizontal direction.

7. The method of making fibrous sheets with composite layers of different character from the same pulp, which consists in providing different compartments for the pulp, in admitting liquid to the compartments to vary the thickness of the pulp, in passing a screen through chambers communicating with said compartments to receive a layer of pulp, and in removing the layers of pulp on the screen in a substantially horizontal direction.

8. The method of making fibrous sheets with composite layers of pulp which consists in varying the thickness of the pulp in different compartments, in partitioning the space outside of a foraminous cylinder to form pulp chambers receiving pulp from the compartments, in passing a screen about the cylinder to receive pulp thereon, in controlling the thickness of the layer on the screen by the partition as it passes from one chamber to another, in withdrawing the pulp on the screen from the top of the cylinder in a horizontal direction, in removing surplus liquid from the interior of the cylinder, and in squeezing, compressing and drying the layers thus formed after the screen passes from the cylinder.

9. In an apparatus for making fibrous board, a forming vat a cylinder movable therein, a screen movable with the cylinder through the vat and taking off from the cylinder at the top thereof in a horizontal direction, and means for forming separate chambers between the cylinder and the sides of the vat for receiving fibrous material of different kinds.

10. In an apparatus for forming a relatively thick sheet of fibrous material, a vat, a foraminous cylinder therein, a screen movable about the cylinder in the vat and separating therefrom at the top of the cylinder in a horizontal direction, and means forming a variable partition between the side of the vat and the screen to provide separate chambers for receiving fibrous material of different character.

11. In a fibrous sheet making apparatus, a forming vat, a screen cylinder therein, a screen movable about the cylinder in the vat and separating from the cylinder at the top thereof in a horizontal direction, means forming a variable partition between the side of the vat and the screen to separate fibrous material of different kinds within the vat, the partition forming means for controlling the thickness of the layer of fibrous material as it passes from one chamber to another.

12. In an apparatus of the class described, a vat, a screen cylinder therein, the screen movable about the cylinder, means forming separate chambers extending from the side of the vat through which the screen is passed, means for admitting fibrous material of different kinds to the separate chambers of the vat whereby the screen will pick up successive layers of fibers of different kinds as it moves through the vat, and the screen moving out of the vat in a horizontal direction from the the screen as it passes from one chamber to thereon.

13. An apparatus for making laminated fibrous board, comprising a vat, a screen movable through the vat and out of the vat in a horizontal direction, means forming separate chambers within the vat through which the screen passes, means for admitting fibrous material of different character to the separate chambers of the vat, and means for controlling the thickness of the fibrous layers upon the screen as it passses from one chamber to another.

14. Apparatus for making a comparatively thick composite sheet of different layers of fibrous material, comprising a vat, a screen movable through the mat and emerging therefrom in a horizontal direction, means forming different chambers within the vat through which the screen moves, means for controlling the thickness of a layer of material upon the screen as it passes from one chamber to another, means for removing surplus liquid from the opposite side of the screen, and means for varying the density of the same fibrous material which is admitted to the different chambers of the forming vat.

15. An apparatus for making a fibrous sheet of layers of varying density comprising a vat, a screen movable through the vat and emerging therefrom in a horizontal direction, means for forming different chambers within the vat through which the screen moves, means for controlling the thickness of a layer of fibrous material upon the screen as it passes from one chamber to another, means for withdrawing surplus liquid from the opposite side of the screen, a mixing box having compartments within communicating with the separate chambers of the vat, means for varying the density of the pulp within the compartments, and means for squeezing and compressing the layers of fibrous material deposited upon the screen after it passes from the forming vat.

JAMES J. HINDE.